United States Patent
Emizu et al.

(10) Patent No.: US 7,699,730 B2
(45) Date of Patent: Apr. 20, 2010

(54) HYDRAULIC TENSIONER LIFTER

(75) Inventors: Osamu Emizu, Saitama (JP); Takeshi Sakai, Saitama (JP); Masashi Furuya, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 743 days.

(21) Appl. No.: 11/226,296

(22) Filed: Sep. 15, 2005

(65) Prior Publication Data

US 2006/0063625 A1    Mar. 23, 2006

(30) Foreign Application Priority Data

Sep. 17, 2004   (JP)   ............................. 2004-270953

(51) Int. Cl.
*F16H 7/08*   (2006.01)

(52) U.S. Cl. ..................................... 474/110

(58) Field of Classification Search ......... 474/109–111, 474/91, 101; 267/136–141, 164–166; 91/394–396
See application file for complete search history.

(56) References Cited

U.S. PATENT DOCUMENTS

| | | | | |
|---|---|---|---|---|
| 2,980,132 A | * | 4/1961 | Prijatel et al. ............... | 137/469 |
| 3,871,193 A | * | 3/1975 | Young ......................... | 464/21 |
| 4,507,103 A | * | 3/1985 | Mittermeier ................. | 474/110 |
| 5,304,099 A | * | 4/1994 | Deppe et al. ................. | 474/110 |
| 5,913,742 A | * | 6/1999 | Nakamura et al. ........... | 474/110 |
| 6,745,792 B2 | * | 6/2004 | Koo ............................ | 137/491 |
| 7,070,528 B2 | * | 7/2006 | Emizu et al. ................. | 474/110 |
| 2004/0087398 A1 | * | 5/2004 | Tanaka ........................ | 474/110 |

FOREIGN PATENT DOCUMENTS

| | | | |
|---|---|---|---|
| JP | 2001165251 A | * | 6/2001 |
| JP | 2003-287092 A | | 10/2003 |

* cited by examiner

*Primary Examiner*—Robert A Siconolfi
*Assistant Examiner*—Anna Momper
(74) *Attorney, Agent, or Firm*—Birch, Stewart, Kolasch & Birch, LLP

(57) ABSTRACT

To provide an adequate biasing load to an endless transmission belt by biasing forces of a plurality of springs with different biasing forces and oil pressure biasing force to permit an easy adjustment. In a structure which includes an almost cylindrical plunger, a tensioner body into which the plunger is fitted, high pressure oil chambers are formed by the tensioner body and the plunger and supplied with oil pressure. Two tensioner springs, a rigid spring and a soft spring are supported by the tensioner body and are arranged in series for biasing the plunger. The plunger in its fully stretched state is supported by the serially arranged rigid and soft tensioner springs. In a condition when the plunger is pushed back from this fully stretched state by a prescribed amount or further, the plunger is supported by the rigid tensioner spring.

20 Claims, 8 Drawing Sheets

HYDRAULIC TENSIONER LIFTER

CROSS-REFERENCE TO RELATED APPLICATIONS

The present non-provisional application claims priority under 35 USC 119 to Japanese Patent Application No. 2004-270953 filed on Sep. 17, 2004 the entire contents thereof is hereby incorporated by reference.

BACKGROUND OF THE INVENTION

1. Field of the Invention

The present invention relates to a hydraulic tensioner lifter which applies tension to an endless transmission belt such as a chain or belt used in the transmission mechanism of an internal combustion engine.

2. Description of Background Art

Conventionally, in an internal combustion engine, a hydraulic tensioner lifter has been used in order to apply tension to an endless transmission belt used in the transmission mechanism, such as a chain. This hydraulic tensioner lifter uses a method which pushes a plunger by means of tensioner spring and oil pressure, where as the plunger stretches, a stretched lifter gives the chain a prescribed tension to suppress oscillation of the chain and ensure stable chain drive. See, for example, JP-A No. 287092/2003 Pages 6-7 and FIG. 2.

The hydraulic tensioner lifter as described in JP-A No. 287092/2003 includes a tensioner lifter body, a hole made in the lifter body, a plunger which is slidably fitted in the hole for forming an oil chamber in the hole of the lifter body and a tensioner spring which biases the plunger in a way to push it out of the hole, where the tensioner spring is located between the bottom of the hole and a plunger adjacent to the oil chamber side end face of an orifice member and as the plunger is pushed out by this tensioner spring and oil pressure fed into the oil chamber, it applies tension to the chain of the internal combustion engine.

In the above hydraulic tensioner lifter, while the internal combustion engine is not working, the hydraulic pump also stops working and the oil in the oil circuit of the hydraulic tensioner lifter falls down by the pull of gravity, causing air to enter the oil circuit of the hydraulic tensioner lifter. Therefore, when the engine is started, it takes some time to remove the air from the oil circuit of the hydraulic tensioner lifter and fill the oil circuit with oil.

Before the oil circuit of the hydraulic tensioner lifter is filled with oil, the endless transmission belt turns with the operation of the internal combustion engine and thus a pushing force is irregularly applied to the plunger of the hydraulic tensioner lifter. Consequently, the plunger is deeply pushed inward by a large pushing force and the plunger base end touches the tensioner body. Also, at the time of start, noise may be generated during transition of the chain from a loose state to a tense state.

If the spring constant of the tensioner spring is increased in order to avoid this, the spring force of the tensioner spring would rapidly grow with an increase in the plunging amount of the plunger, which would cause an excessive force to be applied to the endless transmission belt and thus resulting in an excessive tension on the endless transmission belt.

SUMMARY AND OBJECTS OF THE INVENTION

According to an embodiment of the present invention, a hydraulic tensioner lifter includes a tensioner body having a housing hole, a plunger slidably fitted into the housing hole, a high pressure oil chamber which is surrounded by the tensioner body and the plunger which is fed with oil pressure, and a tensioner spring which biases the plunger in the high pressure oil chamber for movement. The tensioner spring consists of a plurality of springs arranged in series.

An embodiment of the present invention includes a plunger that when it is in a position pushed inwardly by a prescribed amount from its most projecting position, the length of a spring disposed on the plunger side among the plurality of springs is fixed.

An embodiment of the present invention includes a spring that is constant of a spring disposed on the tensioner body side that is the largest among the plurality of springs.

An embodiment of the present invention includes a base of the tensioner body that faces the high pressure oil chamber, an oil inflow hole which opens into the high chamber that is made in the base, a check valve for preventing a backward flow from the high pressure oil chamber that is provided in the oil inflow hole and a relief valve that is provided downstream of the high pressure oil chamber. A first oil channel and a second oil channel are arranged in parallel from the oil inflow hole to the relief valve. The first oil passage is fitted with an orifice. In the second oil channel, the path to the relief valve is blocked off when the plunger is pushed inwardly by a prescribed amount from the most projecting position.

An embodiment of the present invention includes a valve disc of the relief valve that is conical.

An embodiment of the present invention includes a tip of the conical valve disc of the relief valve that projects from the relief valve body of the relief valve toward the first oil channel and the second oil channel.

According to an embodiment of the present invention, when the plunger is extremely projecting, the total spring length of the series of springs is longer and the spring constant of the series of springs is smaller than any of the spring constants of the individual springs. Therefore, the tensioner lifter softly bears the pushing force from the endless transmission belt in response to a change in the tension of the endless transmission belt in a plunger projecting condition, so that the endless transmission belt is stably held in place. Thus, the generation of a large tension on the endless transmission belt is prevented, thereby improving the durability of the endless transmission belt.

According to an embodiment of the present invention, while the spring constant of the series of springs is small as mentioned above with the plunger almost in its most protruding position, the length of a spring disposed on the plunger side is fixed with the plunger in a position pushed inward by a prescribed amount from its most protruding position; and when the plunger is pushed inward further, the spring on the plunger side does not function as a spring and the spring constant with the plunger in that position is larger than the spring constant with the plunger in its most protruding position. Therefore, when the plunger is more deeply pushed inwardly and the base end of the plunger comes close to the tensioner body, a large spring force is generated and contact of the plunger base end with the tensioner body is avoided, thereby preventing the generation of noise.

According to an embodiment of the present invention, because, when the plunger is pushed inwardly further from its position when pushed inwardly by a prescribed amount from its most projecting position, the spring constant is much larger than the spring constant with the plunger in its most projecting position. Thus, even when the plunger is pushed inwardly with a further pushing force, contact of the plunger base end with the tensioner body is surely avoided and the possibility of noise generation is completely eliminated.

According to an embodiment of the present invention, since a check valve that opens into a high pressure oil chamber is provided to prevent a backward flow from the high pressure oil chamber, in such a situation that after the plunger projects due to an instant slack of the endless transmission belt, the endless transmission belt becomes tense again and the plunger is about to be pushed inwardly. Thus, oil pressure which is fed to the high pressure oil chamber as a result of an increase in the capacity of the high pressure oil chamber due to the plunger's projection is prevented from flowing backward from the high pressure oil chamber to the oil path on the hydraulic pump side by the check valve when the plunger is pushed inward further.

According to an embodiment of the present invention, a relief valve is provided downstream of the high pressure oil chamber and a first oil channel and a second oil channel are arranged in parallel from the oil inflow hole to the relief valve. The first oil channel is fitted with an orifice. In the second oil channel, the path to the relief valve is blocked off when the plunger is pushed inwardly by a prescribed amount from the most projecting position. Therefore, when the plunger is between the most projecting position and the position pushed inward by the prescribed amount, the oil pressure in the high pressure oil chamber flows from the first oil channel to the relief valve and also flows from the second oil channel to the relief valve. As a consequence, the plunger is pushed inwardly with a relatively small resistance.

However, when the plunger is pushed more deeply than by the prescribed amount, the second oil channel is blocked off and thus the oil pressure in the high pressure oil chamber flows only through the first oil channel into the relief valve and due to the orifice fitted in this first oil channel the flow resistance of oil pressure is large and consequently the plunger is pushed inwardly with a large resistance. Hence, when the plunger is pushed deep into the tensioner body and the plunger base end comes closer to the base end of the tensioner body an increase in the resistance against the plunger pushing force prevents collision of the plunger base end against the base end of the tensioner body and also suppresses the generation of noise.

According to an embodiment of the present invention, since the valve disc of the relief valve is conical, the conical valve disc stably opens while oil pressure passes through the valve, which prevent chattering.

According to an embodiment of the present invention, since the tip of the conical valve disc of the relief valve or the relief valve body projects towards the first oil channel and the second oil channel, the position of the valve disc in the relief valve can be visually checked easily and properly.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Next a description will be given of a hydraulic tensioner lifter 0 as an embodiment of the present invention, which is shown in FIGS. 1 to 6. This hydraulic tensioner lifter 0 is applied to a transmission mechanism 10 of a valve train of a DOHC engine 1. This hydraulic tensioner lifter 0 is mounted on a small vehicle with the centerline X (see FIG. 1) of the cylinder of the hydraulic tensioner lifter 0 inclined toward the front of the body of a small vehicle such as a motorcycle (not shown).

Figure 1:
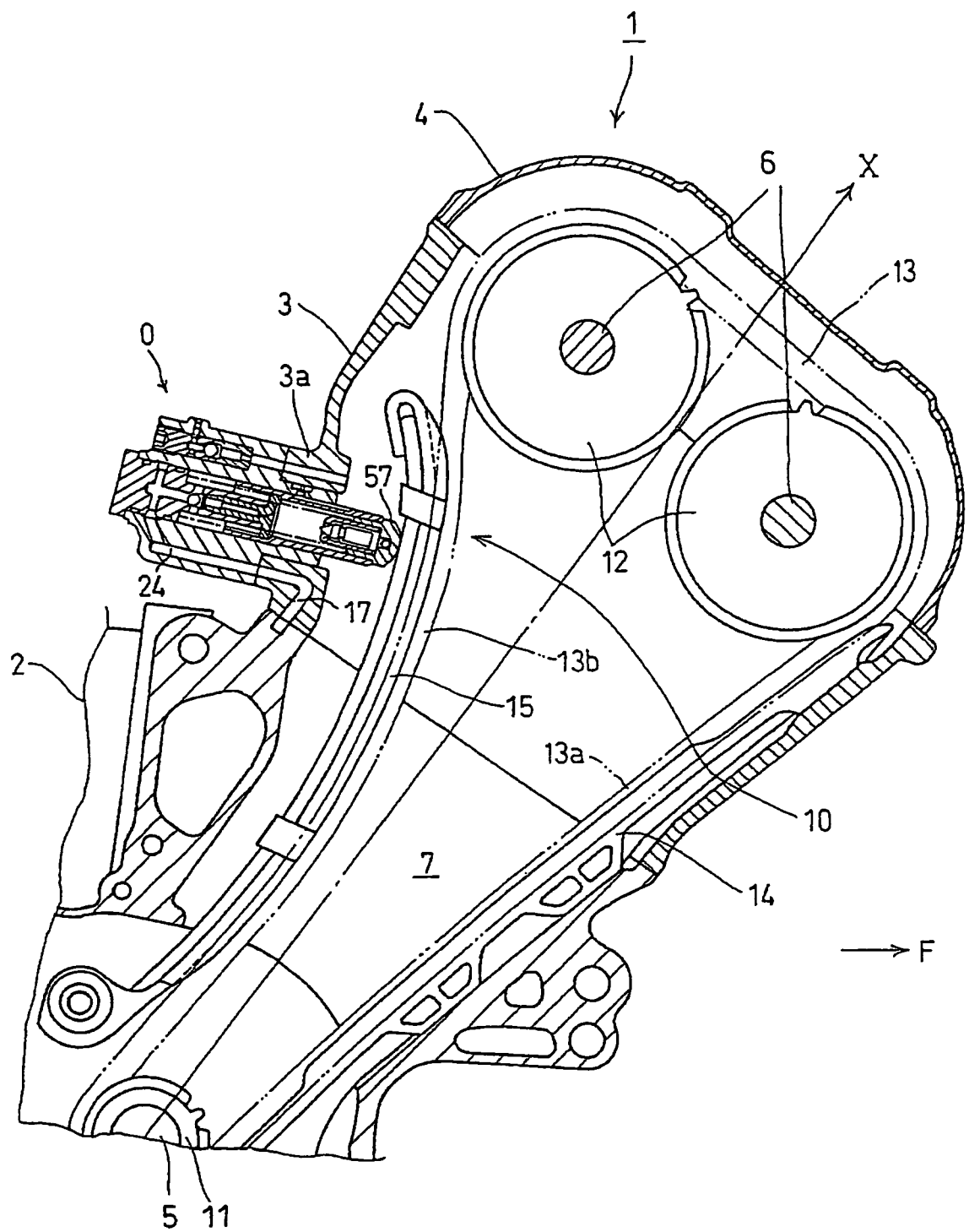
FIG. 1 is a sectional view of the key part of a DOHC engine in which a hydraulic tensioner lifter according to the present invention is used as a tensioner for its timing chain.

The above internal combustion engine 1 is a single-cylinder engine or an in-line multi-cylinder engine in which a plurality of cylinders are arranged in parallel in the vehicle width direction at regular intervals where in a cylinder block 2 of the engine 1, a crankshaft 5 is supported in a manner that it can rotate clockwise as viewed in FIG. 1, and a cylinder head 3 and a head cover 4 are laid over the top face of the cylinder block 2 in sequence. The cylinder block 2, cylinder head 3 and head cover 4 are joined integrally by bolts or the like (not shown).

The above cylinder is almost perpendicular to the joint face of the cylinder block 2 and cylinder head 3 and a piston slidably fitted into this cylinder is connected to the crankshaft 5 through a connecting rod (not shown), so that as the piston goes up and down, the crankshaft 5 rotates clockwise as viewed in FIG. 1.

A pair of intake and exhaust camshafts 6 are rotatably supported in the position of the joint face of the cylinder head 3 and head cover 4 in parallel to the crankshaft 5 and a transmission mechanism 10 lies in a transmission chamber 7 hermetically sealed by the cylinder block 2, cylinder head 3 and head cover 4, surrounding the crankshaft 5 and camshafts 6.

In the transmission chamber 7, a drive sprocket 11 is integrally fitted to the crankshaft 5 and driven sprockets whose pitch diameter is twice that of the drive sprocket 11 are integrally fitted to the pair of camshafts 6 and an endless timing chain 13 is put on the drive sprocket 11 and driven sprockets 12 so that in conjunction with clockwise rotation of the crankshaft 5, the camshafts 6 rotate at a speed which is half the speed of rotation of the crankshaft 5.

In the transmission chamber 7, a chain guide 14 is provided on and in touch with the tense side 13a of the timing chain 13 (right side in FIG. 1) and the lower end of a tensioner slipper 15 is swingably pivoted on the loose side 13b of the timing chain 13 along the outer face of the timing chain 13 and the hydraulic tensioner lifter 0 is located in a rear wall mounting seat 3a of the cylinder head 3 in a way for a front end contact member 57 of the plunger 50 of the hydraulic tensioner 0 to touch the upper part of the tensioner slipper 15. Thus, a required level of tension is applied to the loose side 13b of the timing chain 13 by pushing the upper part of the tensioner slipper 15 with a required pushing pressure, as set forth below.

Next, details of the structure of the hydraulic tensioner lifter 0 will be described referring to FIGS. 2 to 5.

Figure 4:
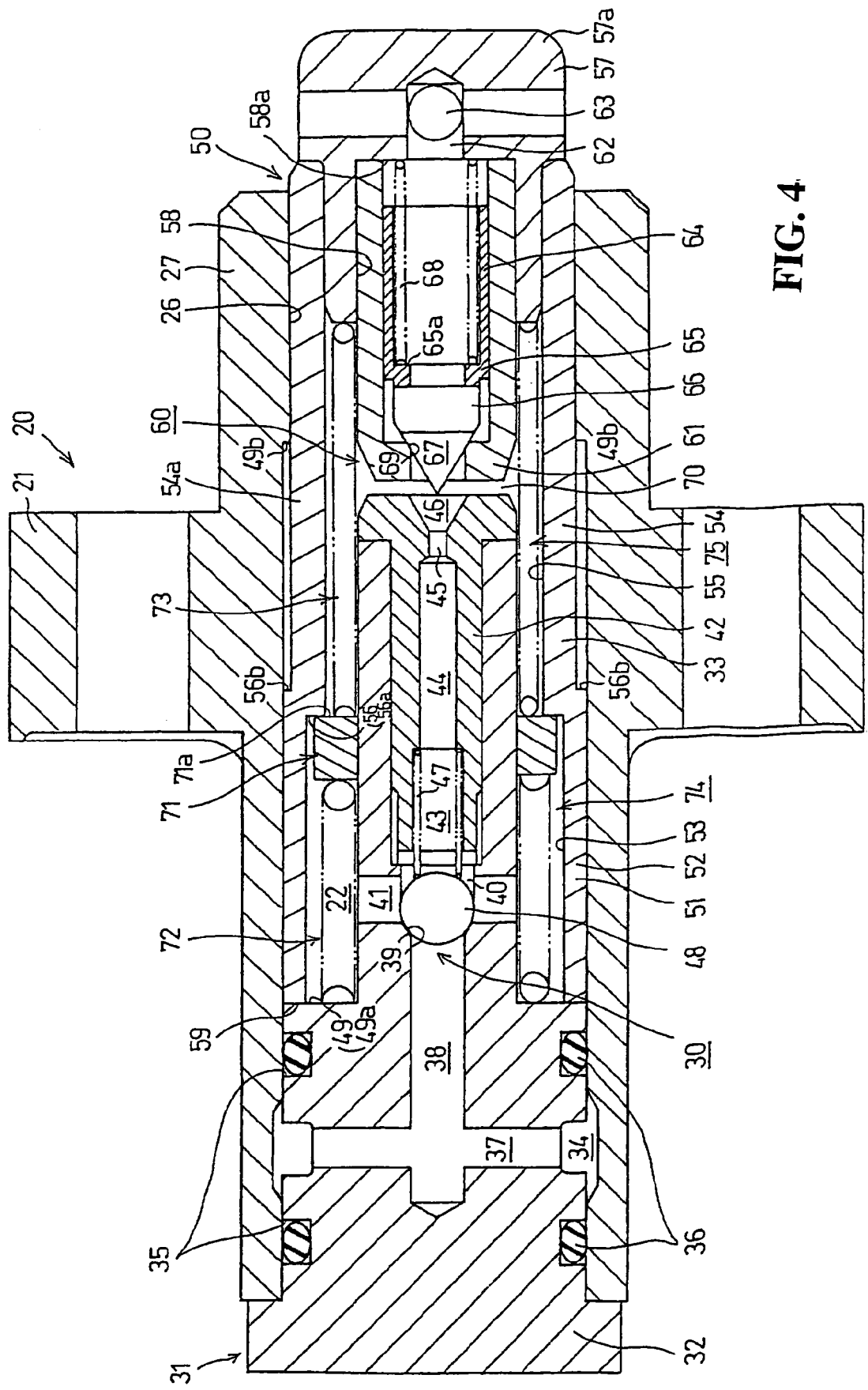
FIG. 4 is a sectional view of the hydraulic tensioner lifter according to the present invention, taken along the line IV-IV of FIG. 5.
Figure 5:
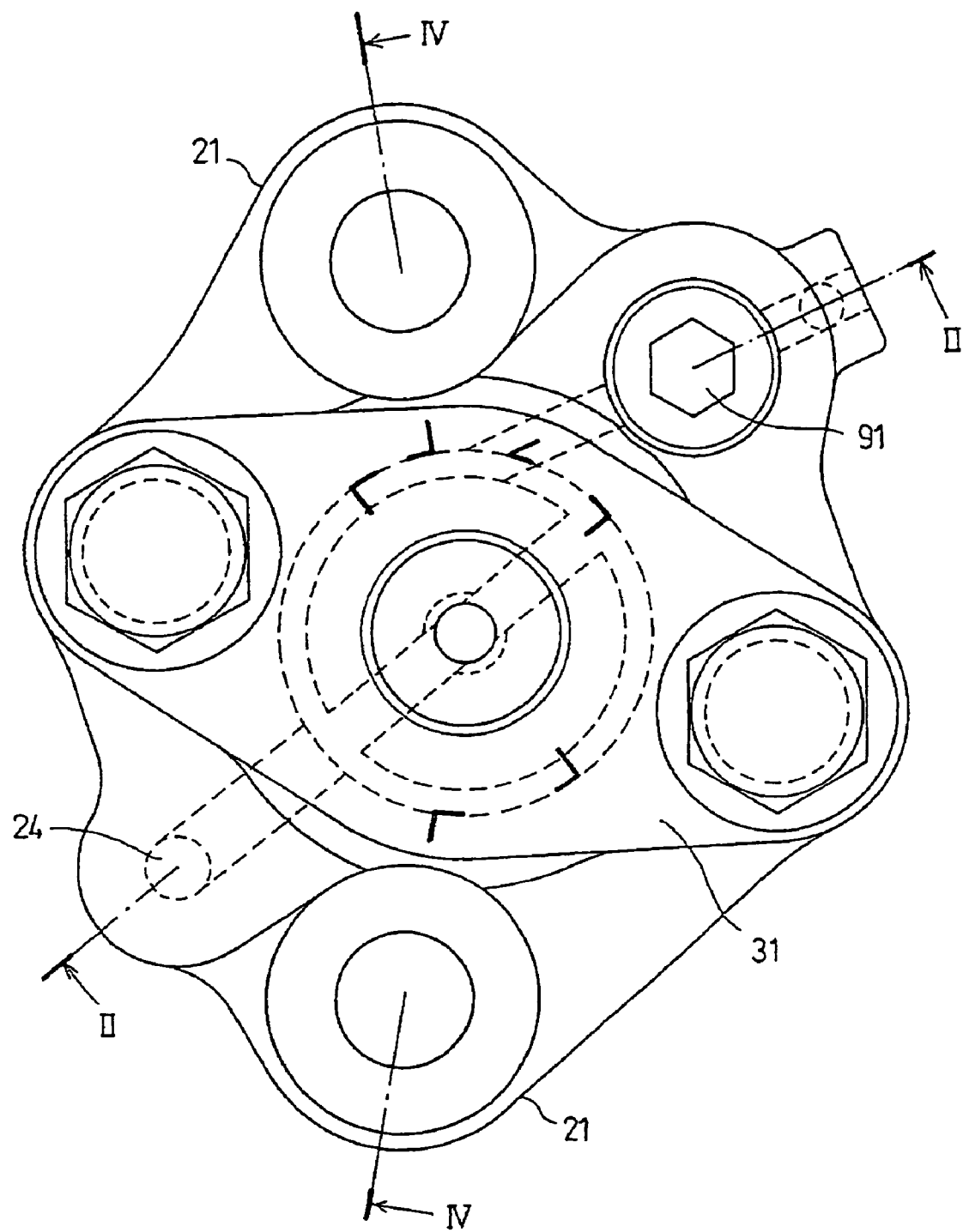
FIG. 5 is a sectional view of the hydraulic tensioner lifter according to the present invention, as viewed from the direction of arrow V.

The hydraulic tensioner lifter 0 has, in the rear wall mounting seat 3a of the cylinder head 3, the following components, a tensioner body 20 detachably fitted with a bolt (not shown) passing through a flange 21 as shown in FIG. 4 and a check valve body 31 of a check valve 30 fitted into a circular check valve body housing hole 22 of the tensioner body 20 with a plunger 50 slidably fitted in a plunger housing hole 26 of the tensioner body 20. A relief valve 60 is provided on the front end contact member 57 of the plunger 50 with an air purge valve 80 housed in an air purge valve housing hole 23 of the tensioner body 20, wherein the check valve body housing hole 22 and the air purge valve housing hole 23 are parallel to each other.

Figure 2:
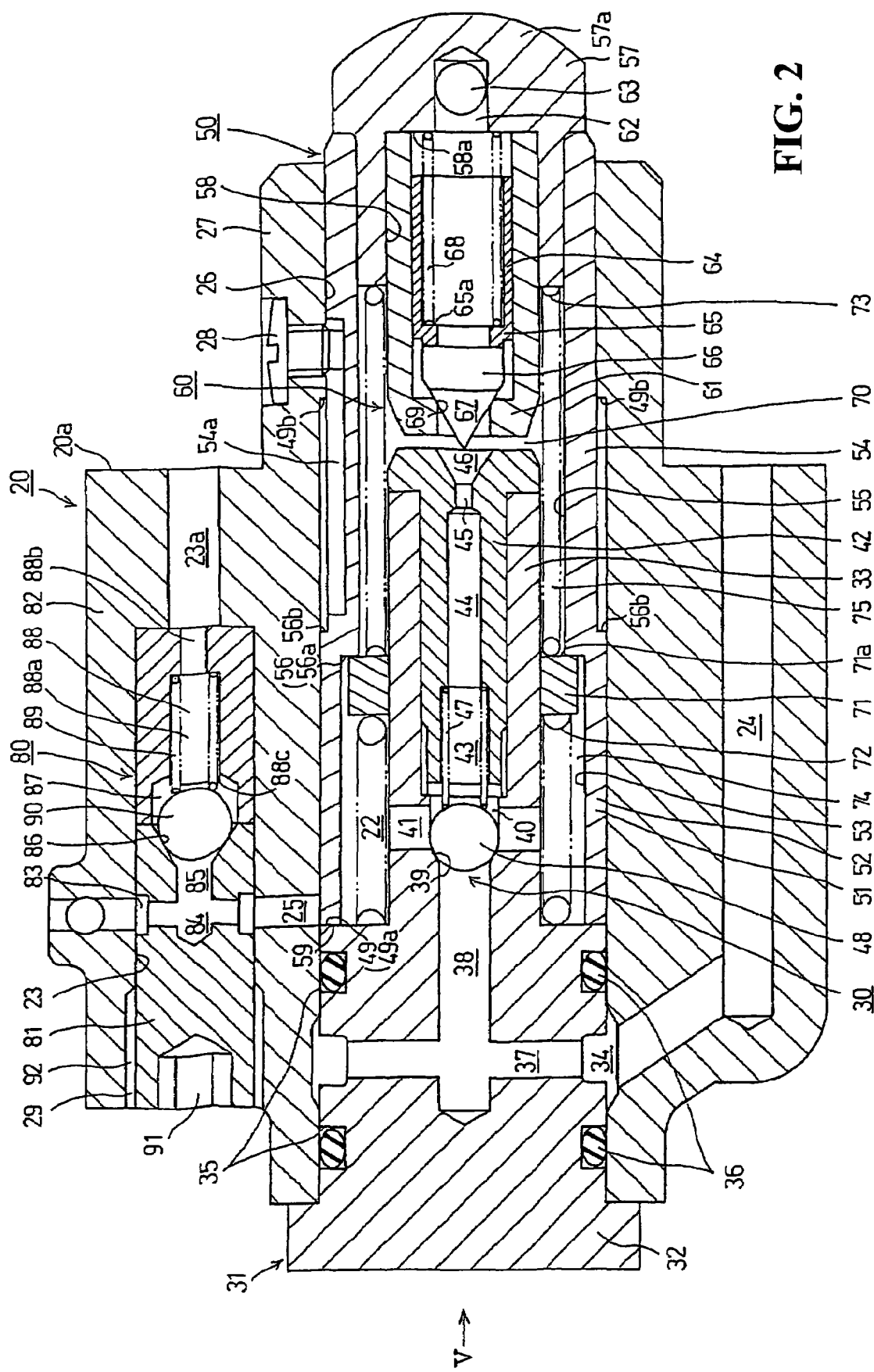
FIG. 2 is a sectional view of the hydraulic tensioner lifter according to the present invention, taken along the line II-II of FIG. 5.
Figure 3:
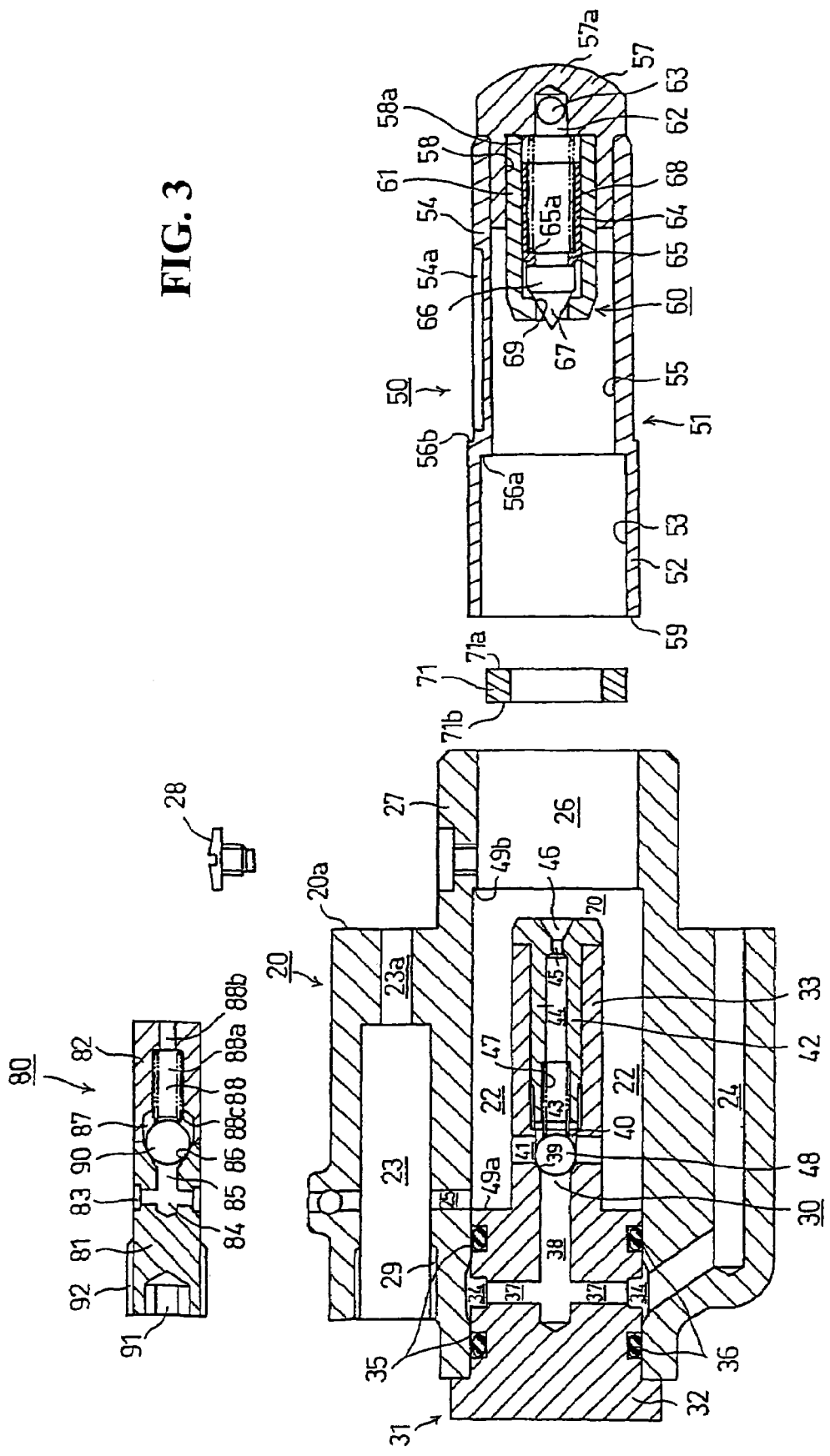
FIG. 3 is an exploded view of the hydraulic tensioner lifter according to the present invention.

In the tensioner body 20, there is a tensioner body oil feed path 24, one end of which is in communication with an engine side oil feed path 17 as shown in FIG. 1 and the other end of which opens into a circular oil feed groove 34 of an inflow oil path 37 of the check valve body 31, where there is a connecting oil feed path 25 formed perpendicularly to the check valve body housing hole 22 and air purge valve housing hole 23, the centerline of the tensioner body 20 coincides with the centerline of the plunger housing hole 26 and there is a circular plunger housing hole 26 in a position nearer to the front end than the check valve body housing hole 22 (the base end side is left and the front end side is right in FIGS. 2, 3 and 4 in this embodiment).

The check valve body 31 consists of a base end large-diameter part 32 fittable into the check valve body housing hole 22 of the tensioner body 20 and a front end small-diameter part which is on the same axis as the base end large-diameter part 32 and has a diameter smaller than the base end large-diameter part 32. The circular oil feed groove 34 is formed around the base end large-diameter part 32 and two circular grooves 35 are formed with the circular oil feed groove 34 between them with ring seals 36 being fitted into the circular grooves 35. The base end large-diameter part 32 is oil-tightly fitted into the outer end of the check valve body housing hole 22 of the tensioner body 20 through the seals 36. The check valve body 31 has an inflow oil path 37, oriented in the radial direction of the check valve body 31, which opens into the circular oil feed groove 34.

An oil feed path 38 is in communication with the inner end of the inflow oil path 37 and oriented toward the front end of the check valve body 31 along the center axis of the check valve body 31 with a valve seat 39 being positioned at the front end of the path 38. A ball valve housing hole 40 is provided that has a diameter larger than the oil feed path 38. An outflow oil path 41 lies nearer to the ball valve housing hole 40 than the valve seat 39 that is radially formed and opens to the outer periphery of the front end small-diameter part 33.

In a throttle valve body 42 pressed into the ball valve housing hole 40 of the check valve body 31, a spring housing hole 43, an oil path 44 with a smaller diameter than the hole 43, a throttle 45 and a conical surface 46 are arranged in the order as identified from the base end of the check valve body 31 to its front end. A valve spring 47 is inserted in the spring housing hole 43. The oil feed path 38, valve seat 39, ball valve housing hole 40, outflow oil path 41, valve spring 47 and ball valve 48 make up the check valve 30. When there is no oil pressure in the oil feed path 38, the ball valve 48, freely fitted in the ball valve housing hole 40, is pressed against the valve seat 39 by the spring force of the valve spring 47 to close the check valve 30.

The plunger 50 consists of a cylindrical member 51, a front end contact member 57 fitted to the front end of a front end small-diameter inner peripheral surface 55 in a front end small-diameter part 54 of the cylindrical member 51, and a relief valve 60 fitted into a relief valve body housing hole 58 of the front end contact member 57. The base end large-diameter part 52 of the cylindrical member 51 is slidably fitted into the check valve body housing hole 22 of the tensioner body 20 with the front end small-diameter part 54 of the cylindrical member 51 being slidably fitted into the plunger housing hole 26 of the tensioner body 20. An inner step end face 56a of a step end face 56 with which a floating sleeve 71 (stated later) can engage is formed at the boundary between the base end large-diameter inner periphery 53 of the base end large-diameter part 52 and the front end small-diameter inner peripheral surface 55 of the front end small-diameter part 54. A guide groove 54a is formed that is oriented toward the generating line direction on the outer peripheral surface of the front end small-diameter part 54. Since the tip of a screw 28 is inserted into the guide groove 54a through the outer wall 27 of the plunger housing 26 of the tensioner body 20, the plunger 50 does not rotate and can slide axially inside the check valve body housing hole 22 and plunger housing hole 26 of the tensioner body 20.

In the front end contact member 57, there are an oil reservoir recess 62 which opens into the front end of the relief valve body housing hole 58 (at the rightmost end in FIGS. 2 and 3). A discharge oil path 63 is provided that is in communication through the oil reservoir recess 62 with ambient air. A relief valve body 61 is fitted into the relief valve body housing hole 58 with a valve holding sleeve 64 being slidably fitted onto the inner peripheral surface of the relief valve body 61. The relief valve disc 66 of the relief valve 60 is fitted to the small-diameter part 65 of the valve holding sleeve 64 with the valve spring 68 being inserted between the end face 65a of the small-diameter part 65 of the valve holding sleeve 64 and the front end face 58a of the relief valve body housing hole 58. Thus, by the spring force of this valve spring 68, the front end conical surface 67 of the relief valve disc 66 is tightly pressed against the valve seat 69 of the relief valve 60 to close the relief valve 60.

With the front end conical surface 67 of the relief valve disc 66 being in contact with the valve seat 69 of the relief valve 60, when the base end face 59 (leftmost end in FIGS. 2 and 3)

of the base end large-diameter part 52 of the plunger 50 is in contact with the stepped end face 49 of the check valve body 31 of the check valve 30 (see FIG. 2), a valve chest 70 exists between the front end face of the throttle valve body 42 and the base end face of the relief valve body 61. In addition, some clearance is provided between the front end conical surface 67 of the relief valve disc 66 and the conical surface opening 46 of the throttle valve body 42.

A rigid tensioner spring 72 with a large spring constant k1 and a soft tensioner spring 73 with a small spring constant k2 are arranged in series, making up a combination tensioner spring The rigid tensioner spring 72 and the floating sleeve 71 are fitted to the front end small-diameter part 33 of the check valve 30 from the front end side of the base end large-diameter part 32 and are located nearer to the front end than the floating sleeve 71. The soft tensioner spring 73 is fitted to the front end small-diameter part 33 and the front end small-diameter inner peripheral surface 55 of the plunger 50.

A circular oil feed groove 83 is provided on the outer peripheral surface of the air purge valve body base end 81 of the air purge valve 80 with an inflow oil path 84 which opens into the circular oil feed groove 83 along the radial direction of the air purge valve body base end 81. An oil feed path 85 is in communication with the inner end of the inflow oil path 84 and is oriented toward the front end of the air purge valve body base end 81 along the center axis of the air purge valve body base end 81 with a valve seat 86 being provided at its front end.

At the base end of the air purge valve body front end 82 of the air purge valve 80 there is a ball valve housing hole 87 having a diameter larger than the oil feed path 85. At the front end of the ball valve housing hole 87 there is a stepped oil path 88 having a diameter smaller than the ball valve housing hole 87. A valve spring 89 is inserted into the large-diameter portion 88a of the stepped oil path 88 and a ball valve 90 is housed in the ball valve housing hole 87.

With the valve spring 89 and ball valve 90 housed inside the air purge valve body front end 82, after the air purge valve body front end 82 is inserted into the air purge valve housing hole 23 of the tensioner body 20, the air purge valve body base end 81 is inserted into the air purge valve housing hole 23. Thereafter, a tool with a hexagonal columnar head (not shown) is inserted into and engaged with a hexagonal hole 91 at the base end of the air purge valve body base end 81 with the male thread 92 of the air purge valve body base end 81 being screwed into the female thread 29 of the tensioner body 20 by turning the tool in one direction so that the air purge valve 80 is built into the air purge valve housing hole 23 of the tensioner body 20.

Since the air purging structure of the air purge valve 80 is the same as that of the air purging structure as described in JP-A No. 287092/2003, a detailed description of it is omitted here.

Next, an explanation will be given of a spring reactive force against a pushing force with no oil pressure fed to the hydraulic tensioner lifter 0.

As illustrated in FIG. 2, for a spring system consisting of the rigid tensioner spring 72 with a large spring constant k1 and the soft tensioner spring 73 with a smaller spring constant k2 which are arranged in series along the direction in which a load is applied, the combination spring constant is calculated as k1·k2/(k1+k2) and this combination spring constant is smaller than the spring constant k1 of the rigid tensioner spring 72 and also smaller than the spring constant k2 of the soft tensioner spring 73.

Figure 6A:
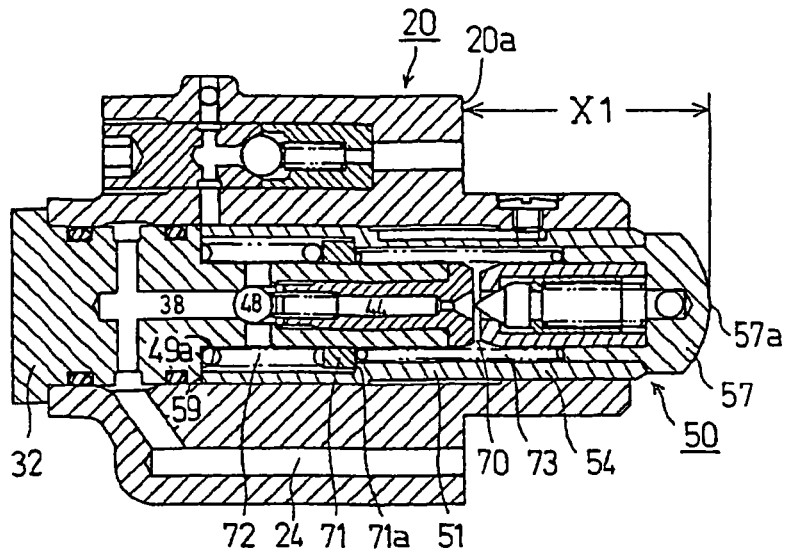
FIG. 6(*a*) to 6(*c*) are sectional views showing three different positions of the plunger of the hydraulic tensioner lifter according to the present invention, wherein FIG. 6(*a*) shows a condition that the plunger is pushed the furthest inwardly, FIG. 6(*b*) is a condition wherein the plunger is in the middle projecting position, and FIG. 6(*c*) is a condition wherein the plunger projects the furthest.
Figure 6B:
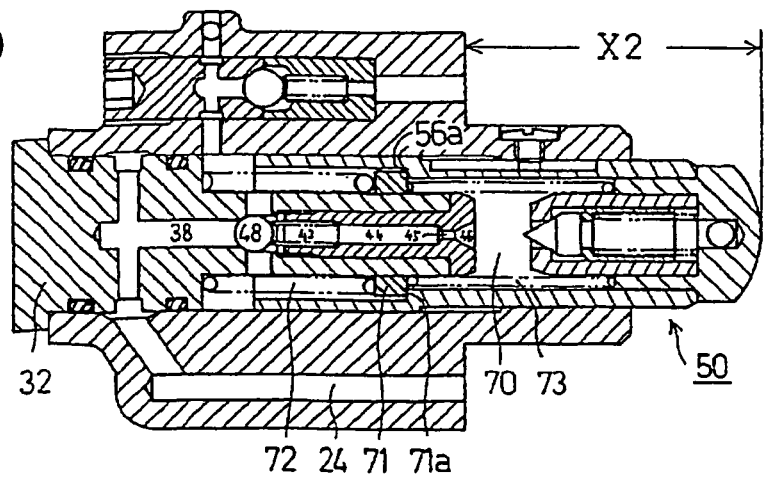
Figure 6C:
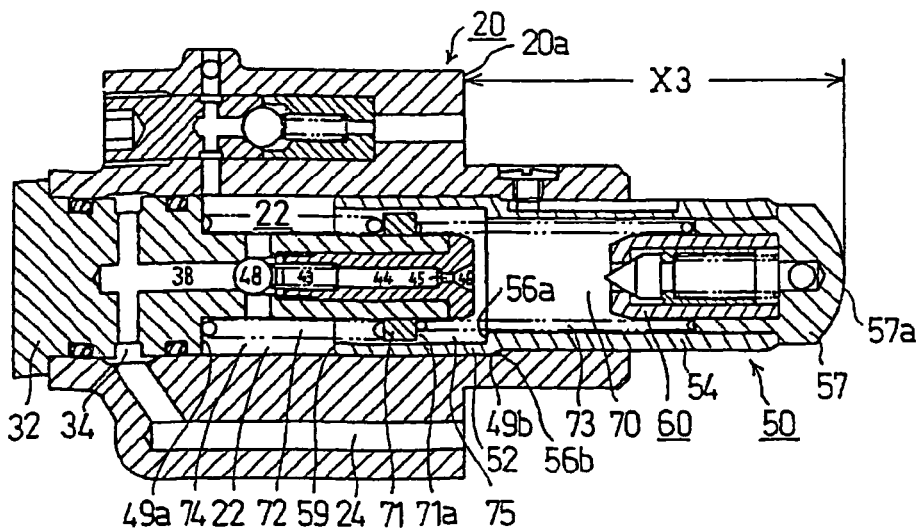

When the rigid tensioner spring 72 and soft tensioner spring 73 that are arranged in series constitute a combination spring, as shown in FIG. 6c, the plunger 50 projects largely from the tensioner body 20 and the front end face 71a of the floating sleeve 71 is off the inner step end face 56a of the plunger 50 with the outer step end face 56b of the front end small-diameter part 54 and base end large-diameter part 52 being in contact with the front end side stepped end face 49b as the boundary step between the plunger housing hole 26 and the check valve body housing hole 22. When the plunger 50 projects the most from the tensioner body 20, the rigid tensioner spring 72 and the soft tensioner spring 73 become serially connected and the spring constant in this condition is the abovementioned small combination spring constant k1·k2/(k1+k2) and the plunger 50 is slightly pushed into the check valve body housing hole 22 of the tensioner body 20.

As the plunger 50 is progressively pushed into the check valve body housing hole 22 of the tensioner body 20, the spring reactive force increases in proportion to the amount of pushing. When the plunger 50 is deeply pushed into the check valve body housing hole 22 of the tensioner body 20 and as illustrated in FIG. 6(b), the front end face 71a of the floating sleeve 71 comes into contact with the inner step end face 56a of the plunger 50, the pushing force applied to the plunger 50 is transmitted, without the intermediation of the soft tensioner spring 73, from the inner step end face 56a of the plunger 50 through the floating sleeve 71 and the rigid tensioner spring 72 to the base end large-diameter part 32 of the plunger housing hole 26. Therefore, in this case, the spring constant is equal to the spring constant k1 of the rigid tensioner spring 72 only and the rate of increase in the reactive force against the force pushing the plunger 50 becomes higher.

As illustrated in FIG. 6(b), when the front end face 71a of the floating sleeve 71 is beginning to touch the inner step end face 56a of the plunger 50, if the force pushing the plunger 50 increases and the plunger 50 is pushed into the check valve body housing hole 22 in a way to come closer to the base end large-diameter part 32 of the tensioner body 20, the reactive force against the force pushing the plunger 50 by the spring force of the rigid tensioner spring 72 only becomes larger.

As illustrated in FIG. 6(a), when the base end face 59 of the plunger 50 comes into contact with the base end side stepped end face 49a of the check valve body 31, the plunger 50 cannot be further pushed into the check valve body housing hole 22.

When the internal combustion engine 1 stops working and no oil pressure is fed to the hydraulic tensioner lifter 0, if a new timing chain 13 is put on the drive sprocket 11 and driven sprockets 12, the plunger 50 is moved inwardly by a smaller distance (ΔX) than when the inner step end face 56a of the plunger 50 is beginning to touch the front end face 71a of the floating sleeve 71 as illustrated in FIG. 6(b). The tensioner body 20, plunger 50, rigid tensioner spring 72 and soft tensioner spring 73 are made so that the amounts of projection of the plunger 50, X1, X2 and X3 as shown in FIGS. 6(a), 6(b) and 6(c), have the relation of X2−X1<X3−X2. Here, each of distances X, X2, and X3 represent the distances in an axial direction from inner end 57a of the front end contact member 57 of plunger 50 to face 20a of the tensioner body 20. Face 20a of the tensioner body 20 abuts against a rear wall mounting seat 3a of the cylinder head 3.

Because the embodiment as shown in FIGS. 1 to 6 is constructed as mentioned above, when a new timing chain 13 is put on the drive sprocket 11 and driven sprockets 12, the internal combustion engine 1 stops working and no oil pressure is fed to the hydraulic tensioner lifter 0, due to the tensile reactive force of the timing chain 13. Thus, the plunger 50 is pushed into the check valve body housing hole 22 of the tensioner body 20b more deeply by ΔX than in the condition as illustrated in FIGS. 6(a) to 6(c). At this moment, the spring force of the soft tensioner spring 73 does not work and the plunger 50 is pushed or biased outwardly only by the spring force of the rigid tensioner spring 72.

In the initial operational stage where the internal combustion engine 1 begins working and the timing chain 13 begins turning between the drive sprocket 11 and the driven sprockets 12, oil pressure from the hydraulic pump does not reach the hydraulic tensioner lifter 0 yet and only the spring force of the rigid tensioner spring 72 with a large spring constant k1 bears the pushing force to the hydraulic tensioner lifter 72 as the timing chain 13 turns.

If the torque transmitted to the crankshaft 5 of the internal combustion engine 1 changes irregularly due to an intermittent combustion in the engine 1 and the tension of the timing chain 13 changes and the loose side 13b of the timing chain 13 seriously slackens for a moment, the plunger 50 projects from the tensioner body 20 further than in the condition as illustrated in FIG. 6(b) and the inner step end face 56a of the plunger 50 is off the front end face 71a of the floating sleeve 71. In this case, the plunger 50 is pushed outwardly by the spring force with combination spring constant k1·k2/(k1+k2) which is smaller than the spring constant k1 of the rigid tensioner spring 72, so that the hydraulic tensioner lifter 0 can adequately absorb a small tension change.

Furthermore, even when the timing chain 13 is used over a long time and its length becomes larger than the original length, the hydraulic tensioner lifter 0 works in the same way as mentioned above.

As the internal combustion engine 1 begins working and a given time elapses, oil pressure from the hydraulic pump (not shown) is sent through the engine side oil feed path 17 of the engine 1, the tensioner body oil feed path 24 of the tensioner body 20, the circular oil feed groove 34 and the inflow oil path 37 to the oil feed path 38. The supplied oil pressure in the oil feed path 38 opens the check valve 30. Thus, oil pressure is supplied into the ball valve housing hole 40 with some of the supplied oil pressure in the ball valve housing hole 40 being supplied to the valve chest 70 through the spring housing hole 43, oil path 44, throttle 45 and conical surface opening 46 (first oil channel). Thereafter, the oil pressure is supplied from the valve chest 70 to a small-diameter oil chamber 75 and at the same time the remaining supplied oil pressure in the ball valve housing hole 40 is supplied to the oil feed path 85 through the inflow oil path 41, large-diameter oil chamber 74, communication oil path 25, and circular oil feed groove 83.

More specifically, at the early stage of hydraulic pump operation, air remains in the oil pressure circuit to the hydraulic tensioner lifter 0 and in the oil pressure circuit in the hydraulic tensioner lifter 0 and the oil pressure flowing in the oil pressure circuits contains much air. The air in the supplied oil pressure in 85 is released to the atmosphere (inside the transmission chamber) through the large-diameter part 88a and small-diameter part 88b of the stepped oil path 88 and the air exhaust hole 23a of the air purge valve housing hole 23. In addition, the air contained in the oil pressure in the oil pressure circuit to the hydraulic tensioner lifter 0 and in the oil pressure circuit of the hydraulic tensioner lifter 0 is discharged into the transmission chamber 7.

As the pressure of the oil pressure in the oil feed path 85 is increased, due to the oil pressure the ball valve 90 touches the base end edge 88c of the large-diameter part 88a of the stepped oil path 88 and the air exhaust from the air purge valve 80 stops. Also, during a low speed operation just after the start of the internal combustion engine 1, the plunger 50 is slightly pushed more towards the base end large-diameter part 32 in the check valve body housing hole 22 of the tensioner body 20 than in the condition as shown in FIG. 6(b). Thus, the front end face 71a of the floating sleeve 71 touches the inner step end face 56a of the plunger 50 and the large-diameter oil chamber 74 and the small-diameter oil chamber 75 are disconnected. Consequently, oil pressure never goes around through the outflow oil path 41, small-diameter oil chamber 75 and large-diameter oil chamber 74 (second oil channel) into the valve chest 70.

When the pressure of the oil pressure which is supplied into the ball valve housing hole 40 and led through the spring housing hole 43, oil path 44, throttle 45 and conical surface opening 46 into the valve chest 70 exceeds the relief pressure of the relief valve 60, the front end conical surface 67 of the relief valve disc 66 of the relief valve 60 gets off the valve seat 69 and the relief valve 60 opens. If the force pushing the plunger 50 is almost constant, a large quantity of oil pressure supplied to the hydraulic tensioner lifter 0 is sent from the relief valve 60 through the relief valve body housing hole 58 and oil reservoir recess 62 to the discharge oil path 63 and discharged into the transmission chamber 7.

If no considerable tension reactive force is generated in the timing chain 13 and the amount of the projection of the plunger 50 is larger than X2 as shown in FIG. 6(b), the rigid tensioner spring 72 and soft tensioner spring 73 function as a serial combination spring. Thus, the combination spring constant k1·k2/(k1+k2) is smaller than the spring constant k1 of the rigid tensioner spring 72 and also smaller than the spring constant k2 of the soft tensioner spring 73, so that the pushing force from the timing chain 13 can be borne flexibly in response to a change in the tension of the timing chain 13.

In addition, when the force pushing the plunger 50 decreases and the front end face 71a of the floating sleeve 71 is released from the inner step end face 56a of the plunger 50 as shown in FIG. (6), the large-diameter oil chamber 74 and the small-diameter oil chamber 75 are connected. In contrast to the situation when the front end face 71a of the floating sleeve 71 is in contact with the inner step end face 56a of the plunger 50, the oil pressure going through the check valve 30 into the ball valve housing hole 40 is supplied not only through the spring housing hole 43, oil path 44, throttle 45 and conical surface opening 46 to the valve chest 70 but also through the outflow oil path 41, large-diameter oil chamber 74 and small-diameter oil chamber 75 to the valve chest 70, so that even if the force pushing the plunger 50 suddenly decreases, the plunger 50 immediately projects from the tensioner body 20 in response to this situation.

When the force pushing the plunger 50 increases, the plunger 50 is pushed towards the base end large-diameter part 32 in the check valve body housing hole 22 of the tensioner body 20 and the pushing force applied to the plunger 50 can be borne by the spring force increase of the rigid tensioner spring 72 corresponding to the pushing amount. In addition, the pressure rise in the valve chest 70 and small-diameter oil chamber 75 attributable to the flow resistance of the oil pressure passing through the throttle 45. On the other hand, when the force pushing the plunger 50 decreases, the plunger 50 projects by the spring force of the rigid tensioner spring 72 and the supply of oil pressure to the valve chest 70 by the closing of the relief valve 60 produces a drop in the oil pressure in the valve chest 70. As a consequence, the tension of the timing chain 13 can be maintained almost constant.

Furthermore, if the force pushing the plunger 50 increases unusually, this large pushing force can be borne because the front end face 71a of the floating sleeve 71 and the inner step end face 56a come into contact with each other. Consequently the large-diameter oil chamber 74 and the small-diameter oil chamber 75 are disconnected, and oil pressure from the ball valve housing hole 40 flows only through the spring housing hole 43, throttle 45 and conical surface opening 46 into the valve chest 70 with a large flow resistance and also because of the large spring force of the rigid tensioner spring 72 that has a large spring constant. Therefore, the plunger 50 is pushed very deeply and as shown in FIG. 6(a), it is possible to prevent the base end face 59 of the base end large-diameter part 52 of the plunger 50 from colliding with the base end stepped end face 49a of the check valve body 31 of the tensioner body 20 to thereby prevent noise which might be generated upon contact of the plunger 50.

Since the front end conical surface 67 is formed on the relief valve disc 66 of the relief valve 60, the change in the pressure of oil flowing between the front end conical surface 67 and the valve seat 69 is continuous and consequently chattering hardly occurs in the relief valve 70.

In the embodiment as shown in FIGS. 1 to 6(c), when the front end face 71a of the floating sleeve 71 comes into contact with the inner step end face 56a of the cylindrical member 51, the large-diameter oil chamber 74 and the small-diameter oil chamber 75 are disconnected by the floating sleeve 71 and the plunger 50 and the floating sleeve 71 move together in the check valve body housing hole 22 of the tensioner body 20 and the cylindrical member 51 and the floating sleeve 71 are designed so that the soft tensioner spring 73 does not bear the pushing force applied to the front end contact member 57 of the plunger 50. However, it is also possible that the base end large-diameter inner peripheral surface 53 of the cylindrical member 51 consists of a large-diameter part 53a, and a small-diameter part 53b which can touch the outer peripheral surface 71c of the floating sleeve 70.

Figure 7:
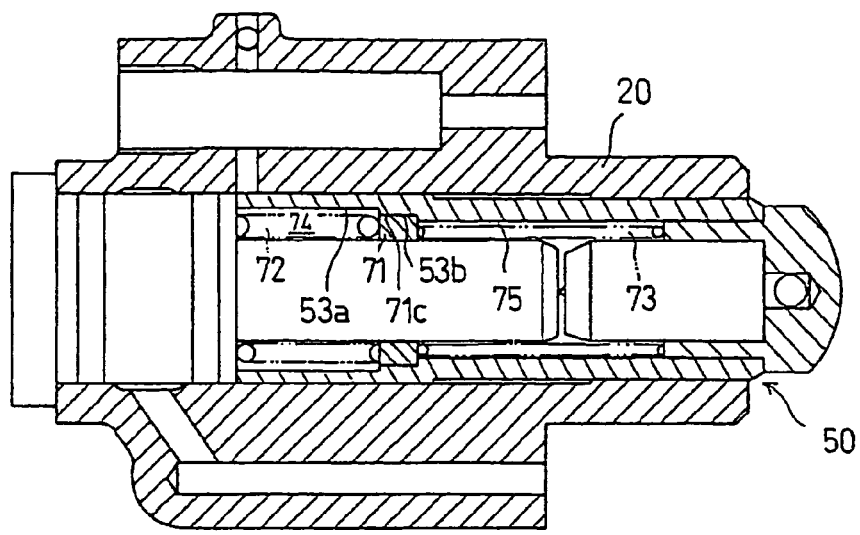
FIG. 7 is a sectional side view of a hydraulic tensioner lifter according to another embodiment of the present invention, wherein the plunger is pushed the most inwardly.
Figure 8:
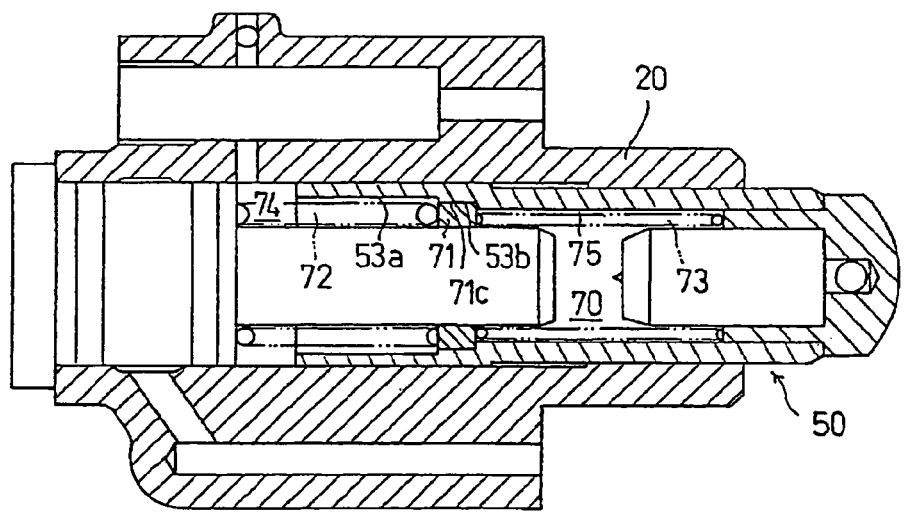
FIG. 8 is a view showing that the plunger in the embodiment shown in FIG. 7 that is less projecting.
Figure 9:
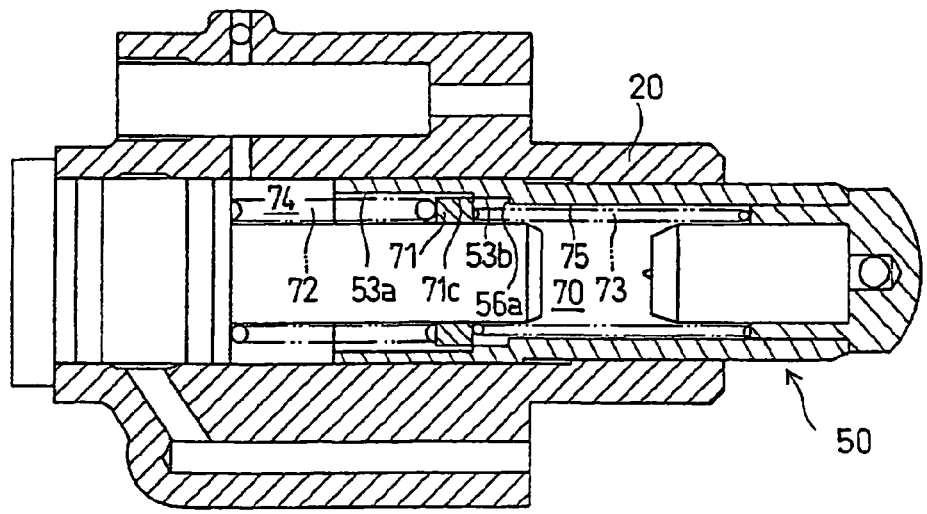
FIG. 9 is a view showing that the plunger in the embodiment shown in FIG. 7 that is moderately projecting.

In the embodiment as shown in FIGS. 7 to 10, the plunger is slightly more inward than in its most projecting state (FIG. 10), and as shown in FIG. 9, the outer peripheral surface front end edge 71d of the floating sleeve 71 is close to the small-diameter part 53b of the base end large-diameter inner peripheral surface 53 of the cylindrical member 51. As the plunger 50 is further pushed inwardly and moves from its position of FIG. 9 to the position of FIG. 8, the large-diameter oil chamber 74 and the small-diameter oil chamber 75 are disconnected. Thus, the oil pressure in the ball valve housing hole 40 flows from the ball valve housing hole 40 into the valve chest 70 only through the spring housing hole 43, oil path 44, throttle 45 and conical surface opening 46 because the large-diameter oil chamber 74 and small-diameter oil chamber 75, constituting the second oil channel, are disconnected, where the flow resistance of the oil pressure from the ball valve housing hole 40 to the valve chest 70 is high and the resistance against the force pushing the plunger 50 is larger than when the plunger 50 moves from the position of FIG. 10 to the position of FIG. 9.

However, while the floating sleeve 71 is moving from the position of FIG. 9 to the position of FIG. 8, the soft tensioner spring 73 shrinks as a spring bearing the pushing force of the plunger 50; therefore, the spring constant of the spring which works on the plunger 50 is the small spring constant of the combination spring consisting of the rigid tensioner spring 72 and the soft tensioner spring 73. Thus, when the floating sleeve 71 moves from the position of FIG. 9 to the position of FIG. 8, the spring force to resist the pushing force of the plunger 50 is smaller than when the floating sleeve 71 moves from the position of FIG. 8 to the position of FIG. 7.

When the floating sleeve 71 moves from the position of FIG. 8 to the position of FIG. 7, the large-diameter oil chamber 74 and the small-diameter oil chamber 75 are disconnected and the spring constant of the spring which works on the plunger 50 is the spring constant k1 of the rigid tensioner spring 72 only and larger than the spring constant of the serial combination spring, $k1 \cdot k2/(k1+k2)$. Thus, the resistance against the force pushing the plunger 50 is large.

Figure 10:
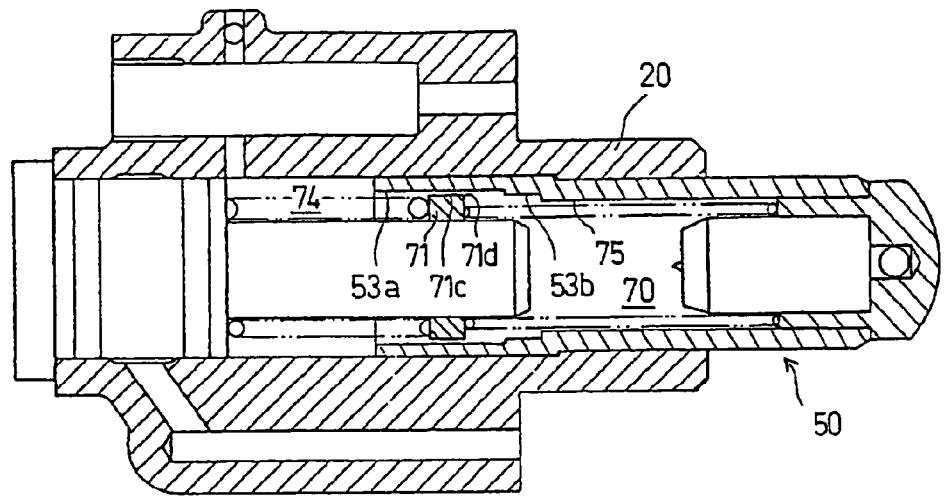
FIG. 10 is a view showing that the plunger in the embodiment shown in FIG. 7 that is projects the most.

What has been described above is summarized as follows. In the condition as shown in FIGS. 10 to 9, the spring constant is $k1 \cdot k2/(k1+k2)$, namely small and also the large-diameter oil chamber 74 and the small-diameter oil chamber 75 are connected and the flow resistance of the oil pressure is small, so that the resistance against the force pushing the plunger 50 is the smallest. In the condition as shown in FIGS. 9 to 8, the spring constant still remains small at $k1 \cdot k2/(k1+k2)$. However, since the large-diameter oil chamber 74 and the small-diameter oil chamber 75 are disconnected by the floating sleeve 71, the flow resistance of the oil pressure is large so the resistance against the force pushing the plunger 50 is moderate. In the condition as shown in FIGS. 8 to 7, the spring constant is large at k1; since the large-diameter oil chamber 74 and the small-diameter oil chamber 75 are disconnected by the floating sleeve 71, the flow resistance of the oil pressure is large so the resistance against the force pushing the plunger 50 is the largest.

While the resistance against the force pushing the plunger 50 changes in two steps in the embodiment as shown in FIGS. 1 to 6(c), the resistance against the force pushing the plunger 50 changes in three steps in the embodiment as shown in FIGS. 7 to 10.

Figure 11:
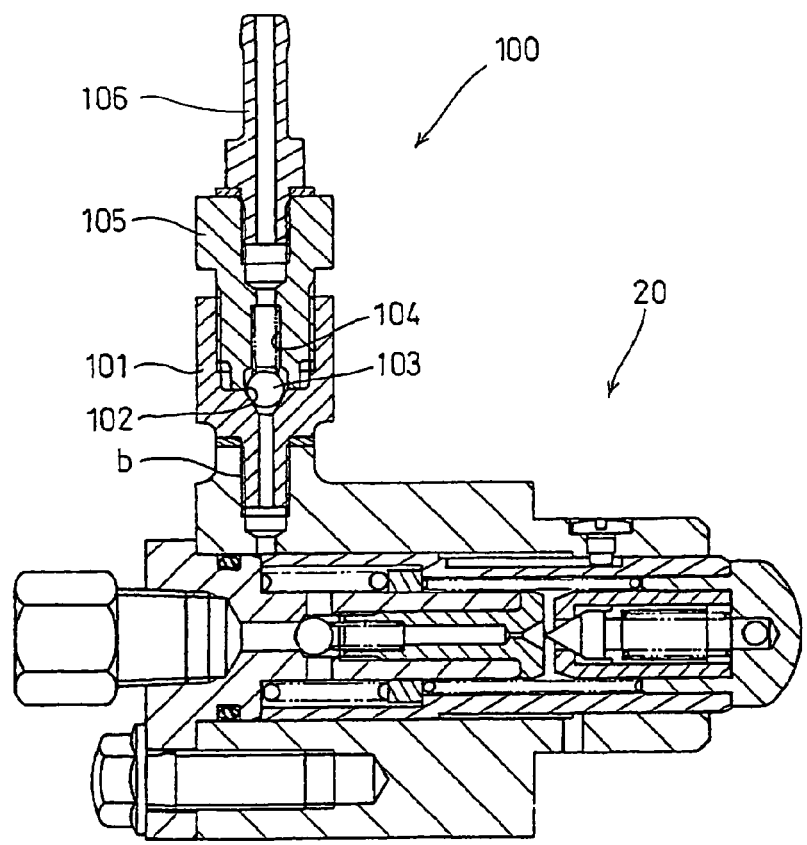
FIG. 11 is a view of a hydraulic tensioner lifter according to a further embodiment of the present invention.

Another possible embodiment of the present invention is as shown in FIG. 11. This embodiment includes an air purge valve 100 as a purging mechanism for air and oil that is not integral with the tensioner lifter 0 but is separate from it. In addition, the air purge valve 100 is mounted in the already assembled tensioner body 20. Thus, the basic structure and functionality of the air purge valve 100 are virtually the same as in the above embodiments and not described here.

The air purge valve 100 is disposed and mounted perpendicularly to the longitudinal direction of the tensioner body 20 and this is achieved by screwing the thread of the air purge valve 100 into a screw hole b made in the side of the tensioner body 20 and fixing the valve integrally. The air purge valve 100 comprises a base 101 which is directly screwed in the side of the tensioner body 20 with a valve spring holder 105, screwed in the base 101, which houses a ball valve 103 pressed into the valve seat 102 of the base 101 with a spring 104 through contact and joint of its joint surface with the base 101 in a manner to allow the valve to come into contact or out of contact freely. An extension passage 106 is screwed in the valve spring holder 105.

The structural members 101 to 106 are serially connected with each other and extend perpendicularly to the tensioner body 20. The air purge valve 100 may be mounted on the tensioner body 20 after the structural members 101 to 106 are joined in advance or the individual structural members 101 to 106 may be mounted on the tensioner body 20 one by one.

In this embodiment, since the air purge valve 100 is a separate unit, the structure of the tensioner lifter 0 is simplified, which makes its manufacture easy. In addition, because the air purge valve 100 can be removed as a separate unit from the tensioner body 20 for repair or adjustment purposes, repair or adjustment work can be easier, which improves working efficiency and offers an advantage in terms of cost.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A hydraulic tensioner lifter comprising:
a tensioner body having a housing hole;
a plunger slidably fitted into said housing hole;
a high pressure oil chamber which is surrounded by said tensioner body and said plunger and fed with oil pressure;
a tensioner spring for biasing said plunger in said high pressure oil chamber so as to make it project; and
a floating sleeve,
wherein said tensioner spring consists of a plurality of springs including a first spring and a second spring arranged in series, and
wherein the plunger includes a front end small-diameter part and a base end large-diameter part and an inner step end face between the large-diameter part and the small-diameter part, the first spring being disposed in the small-diameter part, and the second spring being disposed in the large diameter part,
wherein the floating sleeve is disposed between the first and second spring and is adapted to engage with the inner step end face.

2. The hydraulic tensioner lifter according to claim 1, wherein the first spring among said plurality of springs is disposed on a plunger side, and
wherein when said plunger is in a position pushed inwardly by a prescribed amount from its most projecting position, a spring length of the first spring is fixed.

3. The hydraulic tensioner lifter according to claim 2, wherein the second spring among said plurality of springs is disposed on a tensioner body side, and has a spring constant that is the largest among said plurality of springs.

4. The hydraulic tensioner lifter according to claim 3, wherein the valve disc of said relief valve is conical.

5. The hydraulic tensioner lifter according to claim 2, wherein the valve disc of said relief valve is conical.

6. The hydraulic tensioner lifter according to claim 5, wherein the tip of the conical valve disc of said relief valve projects from the relief valve body of said relief valve toward said first oil channel and said second oil channel.

7. The hydraulic tensioner lifter according to claim 1, wherein a base of said tensioner body faces said high pressure oil chamber;
an oil inflow hole which opens into said high pressure oil chamber is made in said base;
a check valve for preventing backward flow from said high pressure oil chamber is provided in said oil inflow hole and a relief valve is provided downstream of said high pressure oil chamber;
a first oil channel and a second oil channel are arranged in parallel from said oil inflow hole to said relief valve;
said first oil channel is fitted with an orifice; and
in said second oil channel, the path to said relief valve is blocked off when said plunger is pushed inwardly by a prescribed amount from said most projecting position.

8. The hydraulic tensioner lifter according to claim 7, wherein the valve disc of said relief valve is conical.

9. The hydraulic tensioner lifter according to claim 1, wherein the valve disc of said relief valve is conical.

10. The hydraulic tensioner lifter according to claim 9, wherein the tip of the conical valve disc of said relief valve projects from the relief valve body of said relief valve toward said first oil channel and said second oil channel.

11. A hydraulic tensioner lifter comprising:
a tensioner body having a housing hole;
a plunger slidably mounted within said housing hole;
a high oil pressure chamber formed by said tensioner body and said plunger, said high pressure oil chamber being supplied with oil pressure;
a tensioner spring operatively provided for biasing said plunger in said high pressure oil chamber to project a predetermined distance therefrom; and
a floating sleeve,
wherein said tensioner spring includes a plurality of springs including a first spring and a second spring arranged in series, and
wherein the plunger includes a front end small-diameter part and a base end large-diameter part and an inner step end face between the large-diameter part and the small-diameter part, the first spring being disposed in the small-diameter part, and the second spring being disposed in the large diameter part, and
wherein the floating sleeve is disposed between the first and second spring and is adapted to engage with the inner step end face.

12. The hydraulic tensioner lifter according to claim 11, wherein the first spring among said plurality of springs is disposed on a plunger side, and
wherein when said plunger is in a position pushed inwardly by a prescribed amount from its most projecting position, a spring length of the first spring is fixed.

13. The hydraulic tensioner lifter according to claim 12, wherein the second spring among said plurality of springs is disposed on a tensioner body side, and has a spring constant that is the largest among said plurality of springs.

14. The hydraulic tensioner lifter according to claim 13, wherein the valve disc of said relief valve is conical.

15. The hydraulic tensioner lifter according to claim 12, wherein the valve disc of said relief valve is conical.

16. The hydraulic tensioner lifter according to claim 15, wherein the tip of the conical valve disc of said relief valve projects from the relief valve body of said relief valve toward said first oil channel and said second oil channel.

17. The hydraulic tensioner lifter according to claim 11, wherein a base of said tensioner body faces said high pressure oil chamber;
an oil inflow hole which opens into said high pressure oil chamber is made in said base;
a check valve for preventing backward flow from said high pressure oil chamber is provided in said oil inflow hole and a relief valve is provided downstream of said high pressure oil chamber;
a first oil channel and a second oil channel are arranged in parallel from said oil inflow hole to said relief valve;
said first oil channel is fitted with an orifice; and
in said second oil channel, the path to said relief valve is blocked off when said plunger is pushed inwardly by a prescribed amount from said most projecting position.

18. The hydraulic tensioner lifter according to claim 17, wherein the valve disc of said relief valve is conical.

19. The hydraulic tensioner lifter according to claim 11, wherein the valve disc of said relief valve is conical.

20. The hydraulic tensioner lifter according to claim 19, wherein the tip of the conical valve disc of said relief valve projects from the relief valve body of said relief valve toward said first oil channel and said second oil channel.

* * * * *